(No Model.)

W. J. RAU.
CAR FENDER.

No. 520,335. Patented May 22, 1894.

Witnesses
John C. Shaw
S. P. Wolhaupter

Inventor
William J. Rau;
By C. A. Snow & Co. Attorneys,

UNITED STATES PATENT OFFICE.

WILLIAM J. RAU, OF GALVESTON, TEXAS.

CAR-FENDER.

SPECIFICATION forming part of Letters Patent No. 520,335, dated May 22, 1894.

Application filed January 17, 1894. Serial No. 497,172. (No model.)

*To all whom it may concern:*

Be it known that I, WILLIAM J. RAU, a citizen of the United States, residing at Galveston, in the county of Galveston and State of Texas, have invented a new and useful Car-Fender, of which the following is a specification.

This invention relates to car fenders; and it has for its object to effect certain improvements in that class of fenders which are attached to the front end of street and other car trucks for the purpose of saving human life by preventing a body from being thrown under the car wheels.

To this end the invention contemplates an improved fender simple in construction, and consisting of comparatively few parts, while at the same time of a shape which positively prevents a body from getting under the car wheels irrespective of the angle at which the body strikes the fender.

With these and other objects in view which will readily appear as the nature of the invention is better understood, the same consists in the novel construction, combination and arrangement of parts hereinafter more fully described, illustrated and claimed.

Figure 1:
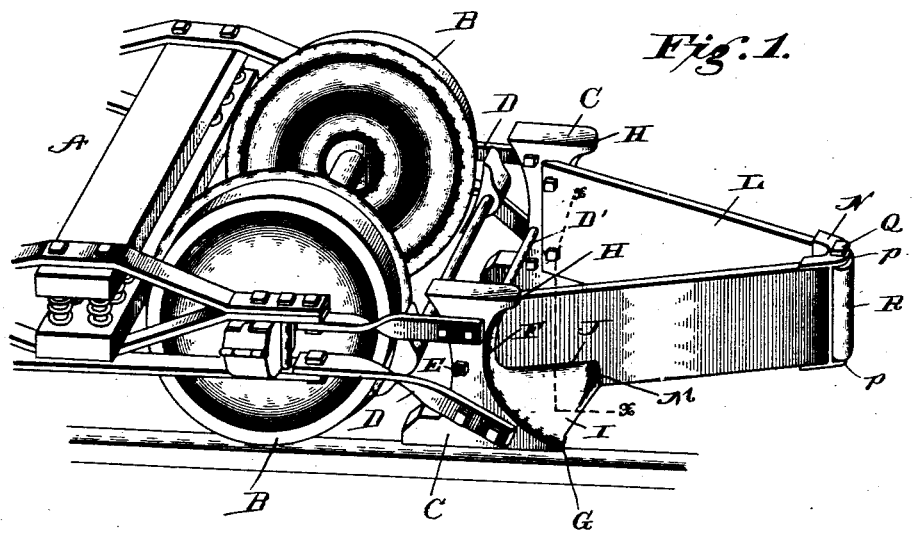
Figure 2:
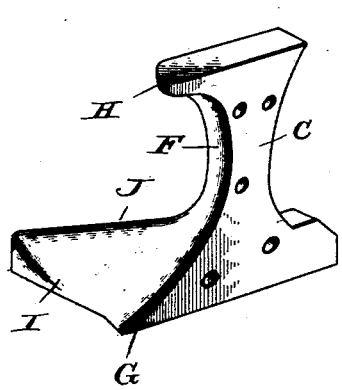
Figure 3:
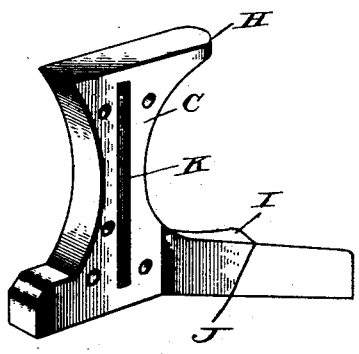
Figure 4:
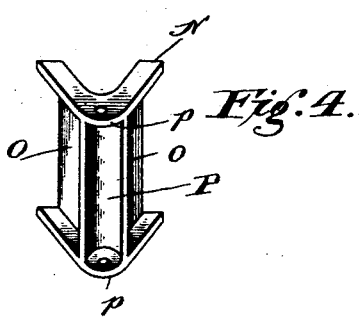
Figure 5:
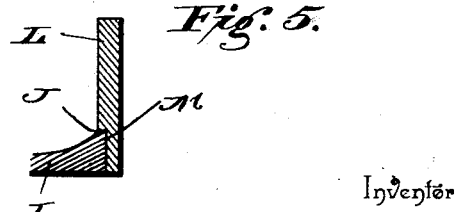

In the drawings:—Figure 1 is a perspective view of the front end of a car truck equipped with my improved fender. Fig. 2 is a detail in perspective of one of the guard shoes. Fig. 3 is a similar view showing the inner side of the shoe. Fig. 4 is a detail in perspective of the V-shaped roller support, with the roller and its journal bolt removed. Fig. 5 is a detail sectional view on the line $x—x$ of Fig. 1.

Referring to the accompanying drawings, A represents an ordinary car-truck of any car in connection with which the herein described fender may be used, and said car truck carries the usual car wheels B, which, in Fig. 1 of the drawings, are illustrated as being the front wheels of the truck beyond which the fender is adapted to be arranged.

Directly in front of the forward car wheels B, are adapted to be arranged the opposite wheel guard shoes C, of the fender attachment. The said guard shoes, which are located directly in front of and in reasonably close proximity to the wheels B, are arranged about one or two inches above the track rails, and are firmly supported in position by means of the supporting rods or irons D, securely bolted thereto and to the opposite front ends of the truck A, outside of the car wheels B, thereby providing a strong attachment of the fender to the car truck. The said guard shoes may be made of either wood or iron, and in the event of being of the last named material the same are preferably cast hollow in order to have a proper degree of lightness.

The opposite guard shoes C, are firmly connected and braced together by means of the transversely arranged brace rods D, having bolt ends E, clamped to the opposite shoes, and said shoes are constructed in a shape having a curved rounded front edge F, extended at the lower end of the shoe into a forwardly projecting rounded foot G, which does not present any sharp point to a body or other object which may happen to come in contact therewith, while the upper front edge of the shoe is extended into a short projected rounded knee H, which insures the positive deflection of a body off to one side of the track, when such body strikes the fender at a point in front of the shoes. The said guard shoes are further provided with the curved inwardly extending guard flanges I, which are disposed at one side of the lower feet G, and are provided at their inner edges with the vertical side portions J, which are disposed at an angle to the body of the guard shoes. The curved guard flanges I, with the inner vertical sides J, complete a substantial mold board shape which is best adapted for gently throwing off an object to one side. The opposite connected guard shoes C, are further provided upon their inner sides with the vertical grooves K, adapted to receive the inner ends of the convergent fender boards L. The said convergent fender boards L, are provided in one side at their inner ends with the squared recesses M, which fit over the inner vertical sides J, of the shoe guard flanges I, and thereby provide a connection which brings the outer faces of the fender boards flush with the vertical sides referred to.

The outer ends of the convergent fender boards L, are made fast to opposite sides of the V-shaped roller support N, which acts in the capacity of a fender tip. The said V-shaped roller support is provided at opposite sides thereof with the angularly disposed pockets O, in which are fitted the front ends of the convergent boards L, and in the front portion of said roller support is formed a roller recess P, with the perforated flanges p, at the top and bottom of the same, to receive the journal bolt Q, on which is journaled a vertical point-roller R, which works in said roller recess.

From the construction herein-described it will be apparent that the complete fender consisting of the opposite guard shoes C, the fender boards L, and the point-roller R, presents no sharp points with which a body can come in contact, but on the contrary provides a fender which will greatly lessen the usually severe shock given to a body when struck by a car, and will deflect such body off to one side of the track and absolutely prevent it from working under the car wheels.

Changes in the form, proportion and the minor details of construction may be resorted to without departing from the principle or sacrificing any of the advantages of this invention.

Having thus described the invention, what is claimed, and desired to be secured by Letters Patent, is—

1. In a car fender, the combination of opposite connected guard shoes adapted to be arranged directly in front of the truck wheels, a front recessed roller support, a vertical point roller journaled in said support, and the convergent fender boards attached at their inner ends to the guard shoes and at their outer ends to said roller support, substantially as set forth.

2. In a car fender, the combination with a car truck; of opposite connected guard shoes attached to the truck directly in front of the car wheels, and a V-shaped fender frame extended beyond said shoes, substantially as set forth.

3. In a car fender, the combination of opposite connected guard shoes adapted to be arranged directly in front of the truck wheels and provided with inwardly extending mold-board shaped guard flanges, and the V-shaped frame projected beyond said shoes and having the opposite inner ends thereof fitted to said guard flanges, substantially as set forth.

4. In a car fender, the combination with the truck; of the fender attached to said truck and consisting of opposite guard shoes disposed directly in front of the truck wheel and provided with curved front edges extended into lower rounded feet, and inwardly extending curved guard flanges having inner vertical sides disposed at an angle, and the convergent fender boards connected at their front ends and having inner recessed ends fitting the inner vertical sides of said guard flanges, substantially as set forth.

5. In a car fender, the combination with a truck; of the fender attached to said truck and consisting of opposite mold-board shaped guard shoes arranged in front of the truck wheels and having inner vertical side portions disposed at an angle, the convergent fender boards having inner recessed ends fitting the side portions of said shoes, a V-shaped roller support having opposite angularly disposed pockets receiving the front meeting ends of said fender boards, and a front roller recess, and a point roller removably journaled in the front roller recess of said roller support, substantially as set forth.

In testimony that I claim the foregoing as my own I have hereto affixed my signature in the presence of two witnesses.

WILLIAM J. RAU.

Witnesses:
H. G. ANDERSON,
G. S. PRAUL.